United States Patent [19]

Skorianetz

[11] 3,911,027
[45] Oct. 7, 1975

[54] BICYCLO[4,3,0]NONENOLS
[75] Inventor: Werner Skorianetz, Geneva, Switzerland
[73] Assignee: Ciba-Geigy Corporation, Ardsley, N.Y.
[22] Filed: Apr. 15, 1974
[21] Appl. No.: 460,838

[30]     Foreign Application Priority Data
    Apr. 16, 1973    Switzerland.......................... 5492/73

[52] U.S. Cl..... 260/617 F; 260/340.5; 260/666 PY; 204/158; 252/522
[51] Int. Cl.²......................................... C07C 35/22
[58] Field of Search................................ 260/617 F

[56]          References Cited
             UNITED STATES PATENTS
3,681,464    8/1972    Theimer.......................... 260/617 F OTHER PUBLICATIONS
Ohloff et al., Helvetica Chimia Acta; Vol. 53, pp. 531–541, (1970).

Takeda et al., Chem. Abst., Vol. 63, 3004d, (1965).

*Primary Examiner*—Howard T. Mars
*Assistant Examiner*—James H. Reamer
*Attorney, Agent, or Firm*—Joseph G. Kolodny; Theodore O. Groeger; John J. Maitner

[57]              ABSTRACT

Certain polymethylbicyclo[4.3.0]non-9-en-7-ols, such as 2,2,6,7-tetramethylbicyclo[4.3.0]non-9-en-7-ol, are obtained by partial dehydration of corresponding polymethylbicyclo[4.3.0]nonan-1,7-diols, such as 2,2,6,7-tetramethylbicyclo[4.3.0]nonan-1,7-diol, a specific embodiment being the partial dehydration of this compound with a catalytic amount of p-toluenesulfonic acid in an inert organic solvent. The compounds obtained by this process are valuable odoriferous substances.

2 Claims, No Drawings

BICYCLO[4,3,0]NONENOLS

DETAILED DESCRIPTION

The present invention relates to a process for the preparation of bicyclo[4.3.0]nonenols, to the compounds obtained according to the invention, as well as to perfume compositions and flavouring compositions containing such compounds.

The compounds obtained according to the invention are bicyclo[4.3.0]non-9-en-7-ols of the general formula I

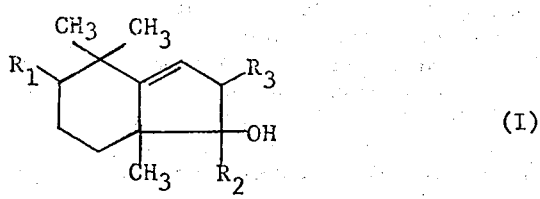

(I)

wherein $R_1$, $R_2$ and $R_3$ each independently represent hydrogen or lower alkyl groups.

In the compounds of the general formula I, $R_1$ is, in particular, a methyl group, especially hydrogen, $R_2$ as a lower alkyl group is, e.g., the ethyl, propyl or isopropyl group and particularly the methyl group, and $R_3$ is especially the methyl group and, in particular, hydrogen.

The compounds of the general formula I are prepared according to the invention by a process in which a compound of the general formula II

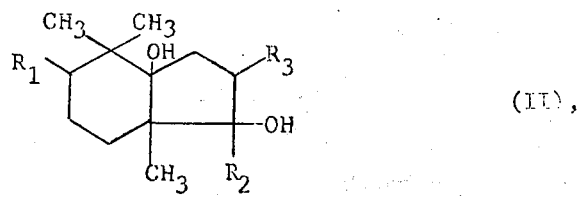

(II), wherein $R_1$, $R_2$ and $R_3$ have the meanings given under formula I, is subjected to partial dehydration.

Partial dehydration can be performed with the aid of diverse, but preferably mild, non-acylating dehydrating agents. For example, mineral acids are suitable, such as phosphoric acid, dilute, e.g. 15–60%, sulphuric acid, or, preferably, dilute hydrochloric acid in a water-miscible solvent such as acetone, ethanol or dioxane, at temperatures of between about 0°C and room temperature. Particularly suitable are organic sulphonic acids, especially arenesulphonic acids, such as p-toluenesulphonic acid or benzenesulphonic acid, for example, in catalytic amounts in an inert organic solvent, such as, e.g. methylene chloride. Dehydration with such sulphonic acids is performed, e.g., at temperatures of between about 0°C and 25°C. A further suitable dehydrating agent is, for example, excess formic acid or oxalic acid at 0°C to room temperature. The preparation of starting materials of the general formula II is described later on in the text.

The compounds of the general formula I, such as, e.g. 2,2,6,7-tetramethylbicyclo[4.3.0]non-9-en-7-ol of the steric formula $I_1$

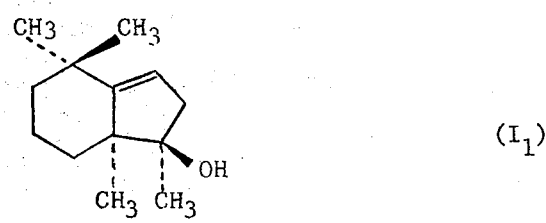

($I_1$)

are very strongly smelling odoriferous substances which are suitable, for example, as components for the preparation of perfume compositions, especially those of a woody-camphoraceous-like type. In the pure state, the compound of formula $I_1$ has a typical cellar note.

The starting materials of the general formula II are likewise for their part new substances. They can be prepared, for example, in two reaction steps from compounds of the general formula III

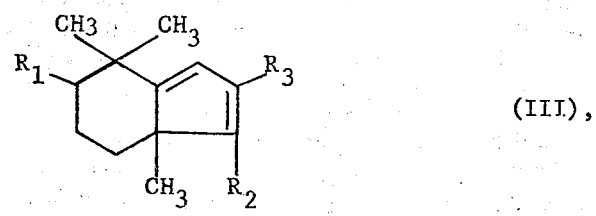

(III), wherein $R_1$, $R_2$ and $R_3$ have the meanings defined under formula I, by a process wherein oxygen is allowed to act with photosensitisation or as singlet oxygen on compounds of the general formula III, with the resulting epidioxy compound of the general formula IV

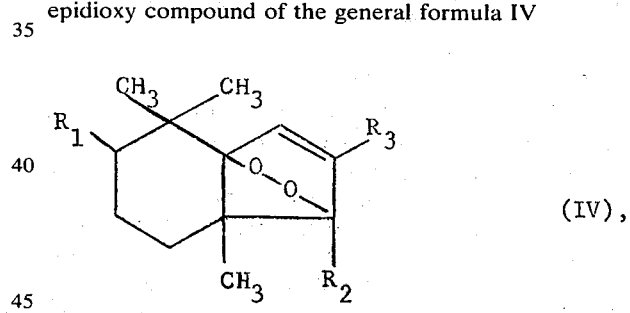

(IV), wherein $R_1$, $R_2$ and $R_3$ have the meanings defined under formula I, being subsequently catalytically hydrogenated. The photosensitised oxidation of compounds of the general formula III is preferably performed in methylene chloride, whereby there are added as sensitising agents about 0.1 – 0.6% of hematoporphyrin and a like amount of hydroquinone, in a suitable apparatus rendering possible irradiation, oxygen introduction and measurement of consumption. The sensitiser used can also be, e.g. about 0.1 to 0.5% of eosin, with oxidation being effected in lower alkanolic solution, e.g. in methanolic or ethanolic solution. Oxidation with "singlet oxygen" is performed, for example, by the gradual addition, e.g. dropwise, of aqueous sodium hypochlorite solution to a solution of the compound of the general formula III and excess hydrogen peroxide in methanol, with stirring and exclusion of light, at room temperature; it is, however, also possible to have a sodium hypochlorite solution together with the compound of the general formula III, and to introduce dropwise a hydrogen peroxide solution below the surface of the reaction mixture. The reaction may also be performed, with the use of chloroform as solvent for the compound of the general formula III, in heterogeneous phase, with vigorous stirring being maintained. With regard to modifications of the oxidation with singlet oxygen, see, for example, C.S. Foote and S. Wexler, J. Amer. Chem. Soc. 86, 3879–3880 and 3880–3882 (1964), as well as E. McKeown and W. A. Waters, J. Chem. Soc. (London) (B) 1966, 1040–1046.

Catalytic hydrogenation of the epidioxy compounds of the general formula IV can be carried out in the usual manner, e.g. in ethanol with the use of a palladium-charcoal catalyst, at room temperature and under normal pressure, preferably to the extent of absorption of the approximately theoretical, i.e., double-molar, amount of hydrogen.

Among compounds of the general formula III, 1,5,5,9-tetramethylbicyclo[4.3.0]nona-6,8-diene has been described by G. Ohloff and G. Uhde in Helv. Chim. Acta 53, 531–541 (1970). According to this publication, the said compound was prepared from the starting material (+)-epoxy-α-dihydro-ionone, which yielded, after being acted on by hydrazine hydrate in methanol at 0°C, 1,5,5,9-tetramethylbicyclo[4.3.0]non-8-en-7-ol, which was then dehydrated by means of 0.1N hydrochloric acid in acetone at 0°C to room temperature to give the stated compound of the general formula III. Other compounds of this general formula can be prepared analogously.

The following preparation example and also the subsequent Examples 2 and 3 concerning perfume compositions further illustrate the invention, but in no way limit its scope. Temperature values are expressed in degrees Centigrade.

EXAMPLE 1 a. A solution of 24 g (0.136 Mol) of 1,5,5,9-tetramethylbicyclo[4.3.0]nona-6,8-diene [3,3a,7,7-tetramethyl-4,5,6,7-tetrahydro-3aH-indene, cp. G. Ohloff and G. Uhde, Helv. Chim. Acta 53, 531–541 (1970)], 100 mg of hematoporphyrin and 100 mg of hydroquinone in methylene chloride is photooxygenated at 10° (Pyrex apparatus, Philips HPK 125 W). The oxygen absorption is 3,400 ml (104% of theory), the rate of absorption about 60 ml/min.. The brown reaction solution is concentrated by evaporation under 15 Torr at 25°, with 28 g of brown oil remaining (98.5% gross yield). Chromatography through silica gel G with cyclohexane/ethyl acetate (8:2, V/V) under 1 atm. pressure yields 12.8 g (45% of theory) of 2,2,6,7-tetramethyl-1,7-epidioxybicyclo[4.3.0]non-8-ene (1,3-a-epidioxy-3a,4,5,6,7,7a-hexahydro-1,4,4,7a-tetramethylidene) in the form of colourless oil, which is distilled in a bulb tube at 110°/0.1 Torr.

b. 2 g (9.6 mMol) of 2,2,6,7-tetramethyl-1,7-epidioxybicyclo[4.3.0]non-8-ene is dissolved in 50 ml of ethanol, and the solution hydrogenated in the presence of 300 mg of palladium charcoal (10%). The hydrogen absorption is 375 ml (80% of theory). The solvent is evaporated off in vacuo to obtain 1.953 g of a colourless, partially crystalline residue. Recrystallisation from petroleum ether (boiling range 30°–50°C) yields 1.5 g (73% of theory) of 2,2,6,7-tetramethylbicyclo[4.3.0]nonane-1,7-diol (5,6,7,7a-tetrahydro-1,4,4,7a-tetramethyl-1,3a(4H)-indanediol) as colourless crystals, M.P. 113°.

c. Some crystals of p-toluenesulphonic acid are added to a solution of 497 mg (2.35 mMol) of 2,2,6,7-tetramethylbicyclo[4.3.0]nonane-1,7-diol in 30 ml of methylene chloride, and the whole is stirred at room temperature. After about 4 hours, no further starting material can be identified in thin-layer chromatography (cyclohexane/ethyl acetate 1:1, V/V). A spatula tip each of sodium bicarbonate and sodium sulphate is added to the reaction mixture, and this further stirred for about 14 hours. After filtration, distillation is performed at 90°/0.1 Torr in a bulb tube, whereby 440 mg (97% of theory) of 2,2,6,7-tetramethylbicyclo[4.3.0]non-9-en-7-ol (2,4,5,6,7,7a-hexahydro-1,4,4,7a-tetramethylinden-1-ol) is obtained in the form of colourless oil.

By virtue of verification that "singlet oxygen" acts always from the sterically least hindered side [K. Gollnick, G.O. Schenk in J. Hamer, 1,4-cycloaddition Reactions, New York, 1967], there is obtained for this dehydration product the steric formula $I_1$ given in the description.

PHYSICAL AND SPECTROSCOPIC DATA OF THE COMPOUNDS OF

THIS EXAMPLE a. 2,2,6,7-tetramethyl-1,7-epidioxybicyclo[4.3.0]non-8-ene:

$n_D^{20} = 1.4881$; $d^{20} = 1.035$ g/cm$^3$

IR(liquid): 3080w, 2920s, 1645w, 1460/1450, doublet, s; 1380s, 1365w, 1342m, 1310w, 1260w, 1200w, 1168m, 1110m, 1063m, 1040w, 1012w, 972m, 942w, 911w, 889s, 843s, 802w, 776w, 732s, 697m, 678s cm$^{-1}$.

NMR (CCl$_4$): δ = 6.12 ppm/AB ($J_{AB}$ = 5.5 Hz)/2P:

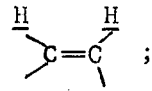

around 1.5/M, broad/~6P:
—(CH$_2$); 1.24/S/3P:

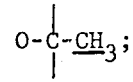

1.01/S/6P:

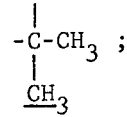

0.92/S/3P:

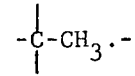

MS: 208 (M$^+$, 9.5), 123 (100), 43 (44), 151 (28), 41 (26), 95 (20), 109 (14.2) 69 (14.2), 55 (14.2), 81 (13.3), 124 (9.5), 67 (8.5), 39 (8.5), 27 (7.6), 166 (6.2), 134 (6.2), 29 (6.2), 53 (5.7), 135 (5.2), 44 (5.2), 107 (4.7), 28 (4.7), 125 (3.8), 98 (3.8), 79

(3.8), 111 (3.3), 92 (3.3), 78 (3.3), 93 (2.8), 193 (1.9), 177 (< 1). UV (C$_2$H$_5$OH): end absorption λ = 206 nm; shoulder at λ = 224 nm (ε = 342) and λ = 246 nm (ε = 205).

b. 2,2,6,7-tetramethylbicyclo[4.3.0]nonane-1,7-diol: M.P. 113°.

IR (KBr): 3210s, 2940s, 1460m, 1426m, 1376m, 1228m, 1160m, 1140m, 1065m, 1032s, 1018s, 939s, 882m, 800m, 783m.

NMR (CCl$_4$): δ = 4.61 ppm/S and 3.97 ppm/S each 1P: 2—OH; around 1.8 ppm/M, broad/~10P: —CH$_2$-protons; 1.14 ppm/S: 1.04 ppm/S and 0.93 ppm/S together 12P:

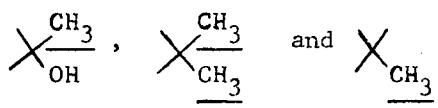

MS. — 208 (M$^+$, missing), 43 (100), 121 (64), 161 (62), 41 (54), 95 (48), 123 (47), 55 (37), 69(35), 136 (34), 82 (32), 81 (28), 107 (27), 179 (27), 109 (25), 176 (23), 93 (22), 119 (21).

c. 2,2,6,7-tetramethylbicyclo[4.3.0]non-9-en-7-ol:

$n_D^{20}$ = 1.4941; $d^{20}$ = 0.9638 g/cm$^3$.

IR (liquid): 3450s, 3060w, 2920s, 1630w, 1460s, 1380/1375, doublet, s; 1342m, 1298w, 1262m, 1222w, 1209m, 1189/1179, doublet, w; 1162/1152 doublet w; 1123w, 1088s, 1077s, 1043w, 1035m, 1008m, 980m, 966m, 952m, 968m, 910s, 870w, 860s, 847s, 802s, 679s cm$^{-1}$.- NMR (CCl$_4$): δ = 5.33 ppm/DD J$_{1/2}$ = 3Hz, J$_{1/3}$ = 1.8 Hz/1P:

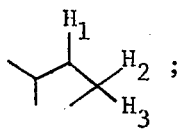

2.24 ppm/AB-spectrum J$_{AB}$ = 16 Hz.

A-part split with J$_{1/2}$ = 1.8 Hz; B-part with J$_{1/3}$ = 3 Hz/2P:

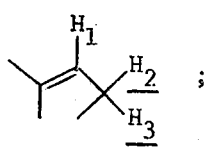

1,3-ppm/M, broad with S at 1.37, which disappears on addition of D$_2$O: —OH and

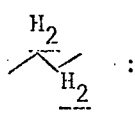

together 5P; 1.12 ppm/S/11P: 3 CH$_3$-groups and

1.00 ppm/S/3P: -CH$_3$.- MS: 194 (M$^+$, 3.4), 43 (100), 121 (93), 161 (75), 136(46), 41 (44), 123 (41), 95 (36), 93 (32), 81 (32), 69 (30), 179 (28), 176 (28), 119 (28), 55 (24), 109 (23), 105 (23), 79 (21).

UV (C$_2$H$_5$OH): end absorption at λ~205 nm.

EXAMPLE 2

A base perfuming composition is prepared by admixing the following ingredients (parts by weight):

| | |
|---|---|
| Cedar oil | 100 |
| Lavandin oil | 100 |
| Absolute oak moss in diethyl phthalate 50% | 80 |
| Coumarin | 80 |
| Diethyl phthalate | 80 |
| Xylene musk | 60 |
| Geraniol | 60 |
| Artificial geranium oil | 50 |
| Terpenyl acetate | 50 |
| p-Tert.butycyclohexyl acetate | 50 |
| Patchouli oil | 40 |
| Linalyl acetate | 40 |
| Clove oil | 30 |
| Galbanum oil 10% | 30 |
| Aspic oil | 30 |
| Artificial rose | 20 |
| Ambrette musk | 20 |
| Sandela | 20 |
| Guaiacum oil | 20 |
| Elemi resinold | 20 |
| Artemisia oil | 10 |
| Camomile oil | 10 |
| | 1000 |

By adding to 97 parts of the above given base composition of the "Fougere" type 30 parts of a 1% solution of 2,2,6,7-tetramethylbicyclo[4.3.0]non-9-en-7-ol (Compound of the formula I, wherein R$_1$ and R$_3$ = hydrogen, R$_2$ = methyl) in 95% ethanol, there is obtained a new composition which possesses a more defined final note of the woody-camphery type. These notes are typical of certain essential oils such as those of cedar, vetiver and patchouli essential oils. The compound is extremely powerful and possesses in its pure state a typical cellar note.

As the odoriferous component of formula I, either the compound of the steric formula I$_1$, or a stereoisomer thereto or also a mixture of several stereoisomers can be used.

EXAMPLE 3

A base perfume composition of the "Fougere" type is prepared by mixing together the following ingredients (parts by weight):

| | |
|---|---|
| Lavandin oil | 100 |
| Art. geranium oil | 100 |
| Amyl salicylate | 80 |
| Methyl salicylate | 5 |
| Benzyl salicylate | 15 |
| Art. bergamot oil | 200 |
| Patchouli oil | 20 |
| Petitgrain oil | 50 |
| Eugenol | 30 |
| Benzyl acetate | 80 |
| Phenylethyl alcohol | 70 |
| 1,1-Dimethyl-4-acetyl-6-ter-butyl-indane | 50 |
| Coumarin | 50 |
| Citronellol | 100 |
| Art. lemon oil | 50 |
| Total | 1000 |

By adding to 900 g of this base composition 100 g of a 1% solution in diethyl phthalate of 2,2,6,7-tetramethylbicyclo[4.3.0]non-9-en-7-ol, there is obtained a composition possessing a much more pro-

What I claim is:
1. A compound of the formula
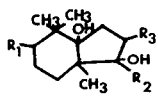
where R1, R2 and R3 each independently represent hydrogen or lower alkyl groups.
2. A compound according to claim 1 which is 2,2,6,7-tetramethylbicyclo[4.3.0]nonane-1,7-diol.
* * * * *